Sept. 6, 1955 F. H. H. DÄMM 2,717,031
INJECTOR OPERATED WELDING AND CUTTING BURNER
Filed Oct. 17, 1950 2 Sheets-Sheet 1

INVENTOR
FELIX DAMM
BY
ATTORNEY

United States Patent Office 2,717,031
Patented Sept. 6, 1955

2,717,031

INJECTOR OPERATED WELDING AND CUTTING BURNER

Felix Heinrich Hubert Damm, Dusseldorf, Germany, assignor of forty per cent to G. Seemann, Coffeyville, Kans.

Application October 17, 1950, Serial No. 190,597

6 Claims. (Cl. 158—27.4)

The present invention relates to an injector welding and cutting burner for operation with a mixture of a fuel gas with oxygen and in particular to a burner in which no back-firing of the flame may occur on one hand and in which simultaneously a return of oxygen in the fuel gas feed line may be safely prevented in case of a clogging of the burner tip or in case of leakiness between the mixing nozzle and the oxygen feed line on the other hand.

Several proposals have been made before for construction of such safety injection burner. Some of those proposals brought about improvements over prior constructions. It was, however, so far impossible to provide an injector-burner which was satisfactory in every respect. In recognizing that back-firing of the flame may be prevented in the first place by increasing the velocity of the fuel gas within the burner, different solutions have been proposed. The mere increase in the oxygen pressure does not prevent the back-firing of the flame. It is necessary, first of all, to provide an ignition velocity for the oxygen-fuel gas mixture which is slower than the velocity of the fuel gas mixture; otherwise back-firing of the flame with all their unpleasant consequences may occur reaching the water container for the gas developer and, in case the latter is not filled properly, even to the gas generator.

A further drawback, inherent in the known devices, may be found in the possibility of entering of oxygen under high pressure into the fuel gas feed line and of producing therein a highly explosive mixture, which upon ignition of the welding and cutting flame brings about accidents of the most dangerous nature. Oxygen may also enter the fuel gas feed line in the known constructions, in case the welding or cutting tip is accidentally not properly secured to and has no gas-tight connection with the burner handle and with the separate feed lines for oxygen and fuel gas, respectively, so that the oxygen chooses the easier way and enters the fuel gas feed line, instead of entering the narrow oxygen pressure nozzle. In this case, likewise, a highly explosive gas mixture develops in the fuel gas feed line.

It is, therefore, one object of the present invention to provide a welding and cutting burner which avoids the stated drawbacks.

It is another object of the present invention to provide a welding and cutting burner in which the injector, which is connected with the narrow oxygen feed line and the narrow oxygen pressure nozzle, respectively, and has at its entrance end a conically expanding boring, looking in the direction of the flow of the gas mixture, has a plurality of cylindrical borings which are aligned, succeeding borings having greater diameters and into which the fuel gas is fed from the gas feed line by movement through a plurality of inclined borings, looking in the direction of the flow of the gas mixture, each of which borings is coordinated to the respective stages of the injector.

It is still another object of the present invention to provide a welding and cutting burner which permits of escape of oxygen into the atmosphere through inclined borings of the lower member of the injector in case of clogging of the burner point and/or in case of leakiness between the oxygen feed line and the adjacent lower member of the injector.

It is yet another object of the present invention to provide a welding and cutting burner which includes a plurality of borings which in the direction of the gas flow are of greater diameters in the injector and in which air suction channels are disposed inclined to the direction of the flow of the gas mixture and which extend from the point where the last boring having the greatest diameter connects with the next adjacent boring.

It is a further object of the present invention to provide a welding and cutting burner having an injector with succeeding bores having greater diameters in order to counteract a throttling in the gas mixture stream and in order to achieve an appreciable increase in the gas velocity at the mixing nozzle.

It is a still further object of the present invention to provide a welding and cutting burner in which a further increase of the velocity of the gas mixture flow is achieved by feeding the burning fluid through several stages provided in the injector.

It is yet another object of the present invention to provide a welding and cutting burner in which atmospheric air is fed to the injector in its last stage, thereby bringing about a saving of about 10% of oxygen and in addition an increase of the fuel gas velocity at the burner tip, and also avoiding a back firing of the flame, since the velocity of the gas mixture stream is greater than the ignition velocity.

It is yet a further object of the present invention to provide a welding and cutting burner in which the oxygen feeding line is narrower than the conically expanding boring provided at the entrance of the injector, so that in case of leakiness between the lower member of the injector and the burner handle the greater part of the oxygen exhausting from the oxygen feeding line still enters the oxygen nozzle and thereby operates with a suction effect on the burning gas.

It is also an object of the present invention to provide a welding and cutting head, the injector of which has means for escaping of the gas mixture into the atmosphere, thereby avoiding the danger of an explosive gas mixture in the fluid feed line.

It is also a further object of the present invention to provide a welding and cutting burner in which an intermediate member is disposed between the burner handle, containing the feed line for the oxygen, and the lower member of the injector, which intermediate member has a central boring leading into a first oxygen pressure nozzle for feeding oxygen and a plurality of channels for feeding the burning fluid by suction to the inclined borings of the lower member of the injector which channels connect the ring-shaped space of the burner handle with the ring-shaped space formed between the lower member of the injector and the intermediate member and the latter has also a plurality of inclined borings which lead to the atmosphere and are connected with the second oxygen pressure nozzle disposed in the lower member of the injector.

With these and other objects in view which will become apparent in the following detailed description, the present invention will be clearly understood in connection with the accompanying drawings, in which Figure 1 is an axial section through the injector burner, in accordance with the present invention;

Figure 1:
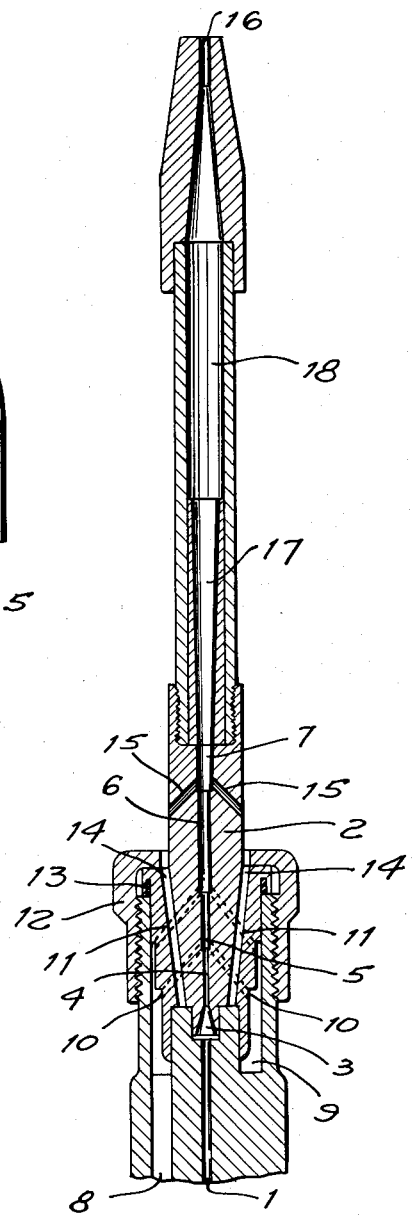

Referring now to the drawing and particularly to Fig. 1, the injector burner comprises a burner handle which has a narrow boring 1 through which oxygen is fed under high pressure into the rear member of the injector 2 which is provided at its entrance with a boring 3 which is conically expanded towards its rear end. The oxygen is fed through the adjacent narrow boring 4 of the oxygen pressure nozzle to the cylindrical injector stages 5, 6 and 7 which having succeeding bores of greater diameter in the direction of the gas stream. The fuel gas, by example, acetylene, is fed through the channel 8 of the burner handle into an annular chamber 9 of the burner handle which communicates with the two first injector borings 5 and 6 by means of the inclined borings 10 and 11. The fuel gas is drawn from the annular chamber 9 by suction and fed separately to the two borings 5 and 6 of the injector. An outer nut 12 secures the rear portion of the injector 2 to its seat in the burner handle by means of an elastic packing 13. The borings 14, which are disposed in the rear portion of the injector 2 and lead into the atmosphere, are of larger cross section than that of the oxygen feeding line 1 and are adapted to exhaust oxygen which may escape in case of leakiness between the oxygen feed line 1 and the rear portion of the injector 2. The borings 14 are disposed in such manner, that they have no connection with the suction borings 10 and 11 for the fuel gas. After passing the first and second injector borings 5 and 6, the gas mixture enters the third injector boring of still greater diameter which communicates with the atmosphere by means of the rearwardly inclined borings 15. Due to the suction effect which is experienced in the third boring atmospheric air is added to the gas mixture. The amount of additional air is about 10%, which brings about a saving of oxygen from the oxygen bottle. The entire cross sectional area of the borings 15 amounts to at least 0.4 of the cross sectional area of the burner tip opening 16, so that in case of clogging of the burner tip opening 16 the gas mixture may escape through the borings 15 into the atmosphere, and still a sufficient suction effect of the oxygen stream prevails, which suction effect provides the suction from the borings 10 and 11, without danger that due to the back firing oxygen enters the gas fuel feed line.

The conically shaped forwardly expanding tube 17 of the injector is inserted in the cylindrical mixing tube 18 leading to the forward end or burner tip 16 and is together with the latter screwed into the front portion of the injector 2. The burner tip 16 is disposed at the outer end of the cylindrical mixing tube 18, which burner tip 16 has, when used as a welding burner, a conically shaped boring diminishing in forward direction (Fig. 1) and terminates into a cylindrical tip opening of small diameter.

The present device may be used also as cutting burner in connection with the above described multi-stage injector. In this case it is merely necessary to substitute a cutting head 19 (Figs. 2 and 3, respectively) for the burner tip or welding head 16 (Fig. 1).

Figure 2:
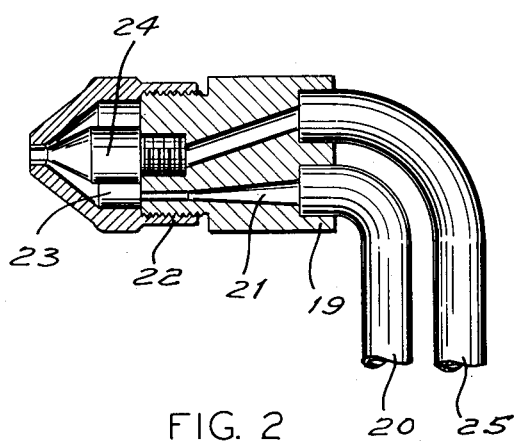
Fig. 2 is an axial section through the burner head with concentrically disposed heating and cutting nozzle.
Figure 3:
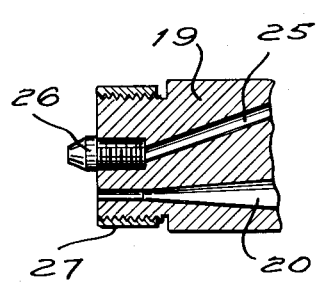
Fig. 3 is a longitudinal section through the burner head with the heating and cutting nozzle disposed next to each other.

In case the burner head 19, as shown in Fig. 2, is used, the gas mixture is fed through the injector 2, expanding tube 17 and mixing tube 18 which leads through the feeding tube 20 to a conically narrowing boring 21 in the cutting head 19 of the heating nozzle 22, which boring 21 terminates in the annular chamber 23. The cutting oxygen is taken from an oxygen bottle in conventional manner and fed to the cutting nozzle 24, which is centrally disposed in the annular chamber 23, by means of the oxygen feed line 25.

Instead of arranging the heating and cutting nozzles in concentric relationship, the same may be disposed one behind the other (Fig. 3), looking in cutting direction. The cutting head 19 is the same as the one shown in Fig. 2. It is merely necessary to remove the concentric heating nozzle 22 and the cutting nozzle 24 is replaced by a short cutting nozzle 26 which is screwed into the cutting head 19. In order to protect the outer thread, disposed at the outer end of the cutting head 19, a protection ring 27 is screwed thereon upon removal of the heating nozzle 22. The gas mixture is fed through the feeding tube 20 while the oxygen is fed through the line 25.

It is well known that particularly in conventional cutting burners in many cases the back-firing of the flame extends into the feed line of the oxygen, though the pressure in the oxygen feed line is much higher than that in the fuel gas line. These back-fires, the cause of which is up to now entirely unknown, can occur only when an explosive mixture is formed in the oxygen feed line by back feed of the fuel gas into the said oxygen feed line. This may bring about grave accidents.

In accordance with the present invention the device may be further improved, in order to exclude particularly in use with cutting burners a back feed of fluid into the the oxygen feed line which is under high pressure and to prevent accidents.

This is brought about by providing as part of the injector 2 an intermediate member 28 (Fig. 4) which is disposed between the above mentioned rear portion of the injector 2 shown in Fig. 1 and the likewise above mentioned burner handle. The intermediate member 28 may be designed at both ends in such manner that it can be added easily to the device without change of the handle or the rear portion of the injector 2 shown in Fig. 1. This member 28 which is secured to the burner handle by means of the above mentioned outer nut 12 has several borings 14' which lead from the contacting face between the member 28 and the burner handle into the atmosphere. In the embodiment, shown in Fig. 4, the intermediate member 28 forms complementary structure with the slightly changed rear portion of the member 2', to form a single unit. The intermediate member 28 is further equipped with a plurality of channels 29 which connect the annular chamber 9 in the burner handle with the annular chamber 31 formed between the rear portion of the member 2' and the intermediate member 28. The fuel gas is thus sucked up under the suction effect exerted by the oxygen feed through the line 8 and the channels 29 by means of the inclined borings 10 and 11 of the rear portion of the member 2' in two stages. A plurality of additional borings 32 are provided in the intermediate member 28 which are directly leading to the atmosphere and terminate in the oxygen pressure nozzle 3 which is disposed at the rear end of the rear portion of the member 2'. Normally about 5% of atmospheric air is sucked through these borings 32, which is about the same amount as the volume of air sucked in through the inclined borings 15 leading into the third boring 7 of the rear portion of the injector 2'. In case there is a tendency that the fuel gas enters the oxygen feed line through the expanded oxygen pressure nozzle 3, it is fed into the atmosphere through the borings 32 and, thereby, rendered harmless. In the same manner escaping oxygen is prevented from a back-firing in the fuel gas feed line and made to escape into the atmosphere through these borings 32, so that any danger for explosion is prevented.

Any conventional cutting head may be used with the present device. Of particular advantage is the burner head, shown in Fig. 4, with combined heating and cutting nozzle. This combined heating and cutting nozzle 22 is screwed to the cutting head 19. The gas mixture is fed through the mixing tube 20 and the boring 21 of the burner head into the annular chamber 33 of the latter, which chamber 33 communicates with the borings 34 of the nozzle 22. The oxygen, which is fed through a conventional line 25 enters through the borings 35 and 36 the latter in the extension 37 of the cutting head 19, the conically diminishing boring 38 of the nozzle 22 and through the narrow cylindrical boring 39 of the cutting nozzle 22 into the atmosphere. In case the combined heating and cutting nozzle 22 is not tightly secured, the main oxygen stream may escape always through the conically diminishing boring 38 and the connected boring 39 into the atmosphere, without inviting the danger, that the oxygen may feed back into the fuel gas line 20. This is brought about since the combined heating and cutting nozzle 22 surrounds the extension 37 of the cutting head 19 with a suction effect, so that this creeping path renders an appreciably greater resistance to the entering oxygen than the borings 38 and 39.

The present invention provides an injection burner which is completely safe from a back-firing and from danger of explosion, and which meets all practical requirements.

It has been found by experience that it is preferable to dispose the borings for the suction of the fuel gas communicating with the respective injector stages in displaced position relative to each other and to proportion the cross sectional area of said borings in such manner that in each stage about the same amount of fuel gas is sucked up, by example that in a two-stage injector about one-half of the required fuel gas is sucked up in each stage.

In order to provide an easy escape into the atmosphere for the oxygen in case of leakiness between the oxygen feed line and the rear portion of the injector, it is of advantage to devise the cross sectional area of the borings through which the oxygen escapes larger than the cross sectional area of its feeding line in the burner handle.

It is also preferable, for economy in its manufacture, to form the mixing nozzle and the injector in two separate parts, in which case the lower portion of the mixing nozzle contains the oxygen pressure nozzle and the multi-stage injector, while the conically forwardly expanding portion of the mixing nozzle is inserted into the mixing tube which leads to the burner tip and together with the latter is screwed to the rear portion of the mixing nozzle.

Figure 4:
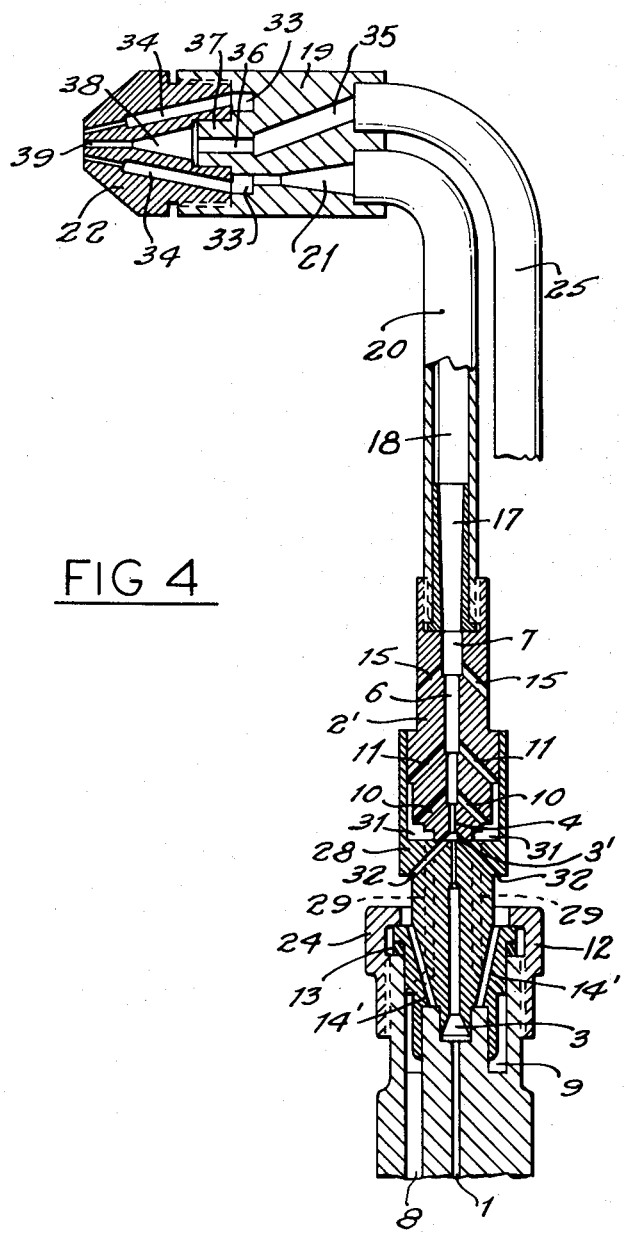
Fig. 4 is an axial section through another embodiment of the injector burner.

In the second embodiment, shown in Fig. 4, the intermediate member is connected with the rear portion of the injector by threading or the like. The rear portion of the injector is the same as in the first embodiment and is connected with the complementarily constructed intermediate member in such manner that the air suction borings, disposed in the rear portion of the injector at the point where the second stage enters the third stage, are directly communicating with the atmosphere. The connecting end of the burner handle is likewise of the same structure as shown in the first embodiment and surrounds the rear nozzle of the intermediate member with suction effect. The solid connection between the connecting portion of the burner handle with the intermediate member is achieved in the same manner as in the first embodiment by means of an outer nut, together with a conventional packing.

While I have disclosed several embodiments of the present invention, it is to be understood that these embodiments are given by example only and not in a limiting sense, the scope of the invention being determined by the claims.

I claim:

1. In a mixer, a tubular member, an injector comprising a main member and an intermediate member, the said main member having one tubular end extending into one end of the said tubular member, said tubular end having diminishing inner diameter in rearward direction, a plurality of aligned first borings provided in the said injector in order to set a plurality of stages in the said injector, the said succeeding first borings having smaller diameters in rearward direction, the rearmost of the said first borings terminating into a second conically shaped boring expanding in rearward direction and being aligned with the said first borings, the said main member forming an annular shoulder facing forwardly, a plurality of third borings inclined in forward direction and communicating each of the said first borings with the periphery of the said main member, and the said intermediate member comprising a fifth boring conically expanded toward its rear end, a sixth boring aligned with the said fifth boring, and a seventh boring of smaller diameter than that of the sixth boring and aligned with the latter, the seventh boring being aligned and communicating with the said second conically shaped boring, the forward end of the said intermediate member being formed to a hollow cylinder, the latter surrounding and engaging at least one part of the said main member of the injector, another part of the said main member being spaced apart from the inner wall of the said cylinder and forming a second annular chamber therein, the rear end of the said intermediate member forming an annular recess, a handle, one portion of the said handle being received by the said annular recess formed at the rear end of the said intermediate member, another portion of the said handle surrounding the said intermediate member at least for a part of its length, sealing means disposed between the said intermediate member and the surrounding portion of the said handle, the outer wall of the said intermediate member being partly spaced apart from the surrounding portion of the handle to form a first chamber, an oxygen feed line disposed in the said handle communicating with the said fifth boring of the said intermediate member, a fuel gas feed line in the said handle communicating with the said first chamber, at least the most forward third borings of the said main member communicating with the atmosphere and the other of the said third borings of the main member communicating with the said second chamber, a plurality of fourth borings in the said intermediate member extending from the said annular recess disposed at the rear end of the said intermediate member and communicating with the atmosphere, in order to provide airing means for any leakage of oxygen at the connection between the said handle and the said intermediate member, a plurality of eighth borings disposed in the said intermediate member and connecting the said first chamber with the said second chamber, and means for securing the said intermediate member to the handle.

2. In a mixer, a tubular member forming a first chamber, an injector having one tubular end extending into one end of the said tubular member, said tubular end having diminishing inner diameter in rearward direction, a plurality of aligned first borings provided in the said injector in order to set a plurality of stages in the said injector, the said succeeding first borings having smaller diameters in rearward direction, the rearmost of the said first borings terminating into a second conically shaped boring expanding in rearward direction and being aligned with the said first borings, the rear end of the said injector forming an annular recess, the said injector forming an annular shoulder facing forwardly, a plurality of third borings inclined in forward direction and communicating each of the said first borings with the periphery of the said injector, a handle, one portion of the said handle being received by the said annular recess formed at the rear end of the said injector, another portion of the said handle surrounding the said injector at least for a part of its length, sealing means disposed between the said injector and the surrounding portion of the said handle, the outer wall of the said injector being partly spaced apart from the surrounding portion of the handle to form a first chamber, an oxygen feed line disposed in the said handle and communicating with the said second boring of the injector, a fuel gas feed line in the said handle communicating with the said first chamber, at least the most forward disposed third borings of the injector communicating with the atmosphere and the other of the said third borings of the injector communicating with the said first chamber, a plurality of fourth borings in the said injector extending from the said annular recess disposed at the rear end of the injector and communicating with the atmosphere, in order to provide airing means for any leakage of oxygen at the connection between the handle and the injector, and means for securing the said injector to the handle.

3. The mixer, as set forth in claim 2, in which said inclined third borings are angularly displaced relative to each other in the respective stages and the cross-sectional area of the said third borings leading into each stage of the said succeeding first borings is of such dimension that about the same amount of fuel gas is fed into each stage of the said first borings.

4. The mixer, as set forth in claim 2, in which the cross sectional area of the said fourth borings is larger than that of the oxygen feed line.

5. The mixer, as set forth in claim 2, in which the said means for securing the said injector to the handle comprise a nut threaded to the outer face of the said handle, said nut having an internal shoulder facing the said annular chamber of the said injector.

6. The mixer, as set forth in claim 2, in which the entire cross-sectional area of the said plurality of third borings communicating with the atmosphere amounts to at least 0.4 of the cross-sectional area of the opening of the burner head.

References Cited in the file of this patent

UNITED STATES PATENTS

| | | |
|---|---|---|
| 1,958,044 | Hendricks | May 8, 1934 |
| 2,008,130 | Damm | July 16, 1935 |
| 2,095,751 | Kirk | Oct. 12, 1937 |
| 2,109,251 | Jacobsson | Feb. 22, 1938 |

FOREIGN PATENTS

| | | |
|---|---|---|
| 93,042 | Switzerland | Oct. 24, 1938 |